Oct. 29, 1935.    J. Y. BLAZEK ET AL    2,019,042
ARC TRANSFERRING MEANS
Filed July 3, 1933
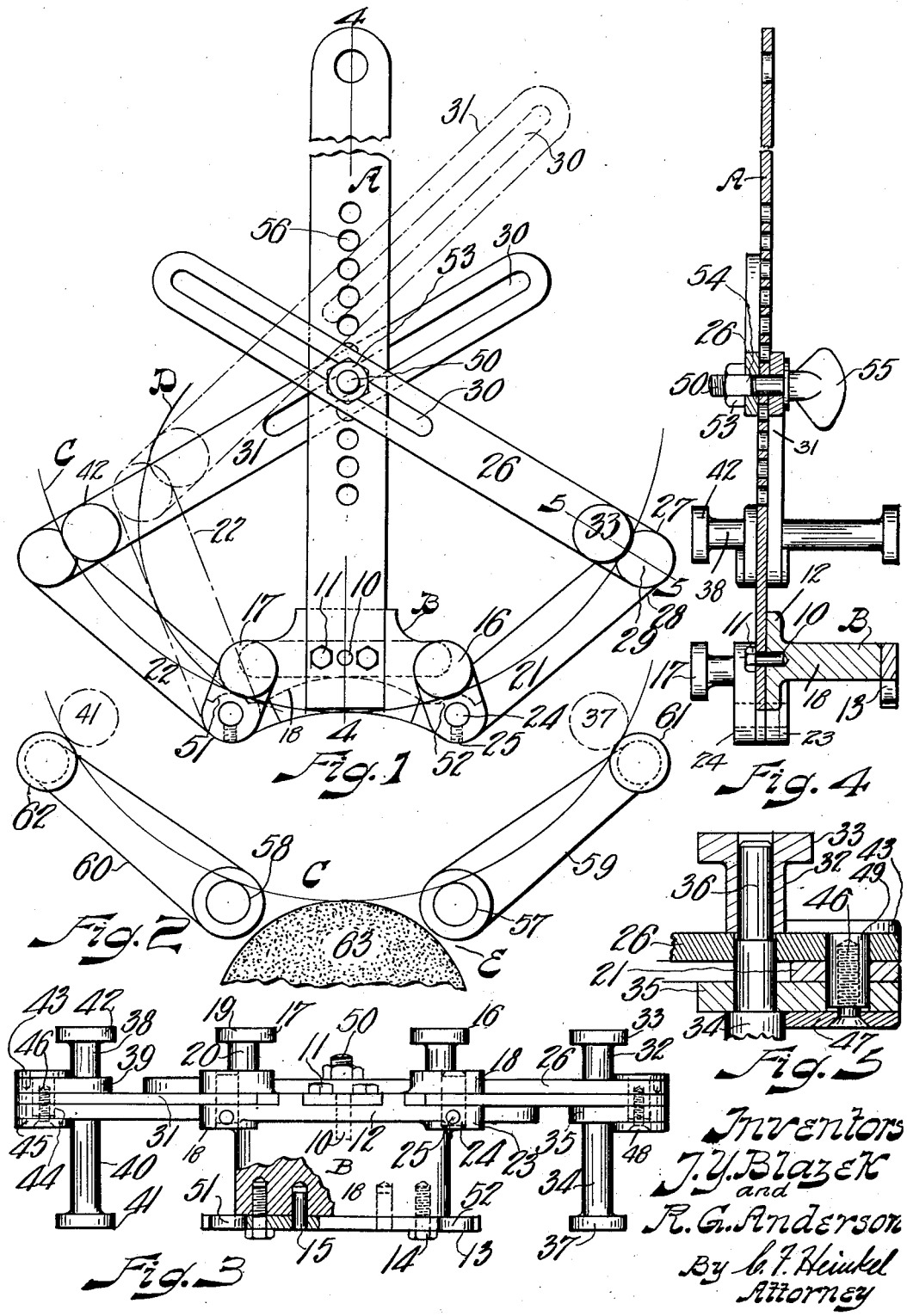

Patented Oct. 29, 1935

2,019,042

UNITED STATES PATENT OFFICE 2,019,042

ARC TRANSFERRING MEANS

John Y. Blazek, Maple Heights, and Russell G. Anderson, Cleveland, Ohio, assignors to Lempco Products Inc., Bedford, Ohio Application July 3, 1933, Serial No. 678,854

6 Claims. (Cl. 33—175)

The present invention relates to transferring an arc from one element to another.

It is of advantage to have a device which can be set to the outside of the arcuate braking surface of a brake drum, for instance, and then be applied to the inside of the arcuate braking surface of a brake shoe for that drum to check the arcuate accuracy of the shoe relative to the arc of the brake drum.

Such a device is also of advantage when a brake shoe truing device is used in that an arc transferring device, such as is illustratively shown and described in this application, can be set to the arc of the brake drum, then applied to the brake shoe truing device and the shoe guiding means of this device is then adjusted to conform to the arc to which the transferring device has been set. The arc transferring device acts as a gage to be set to an existing arc and to gage the setting of a device which is to duplicate the existing arc on another element.

The present invention resides in an arc transferring means or gage which can be set to an existing arc to check an arc of a part which is to fit thereto and can be applied to set an adjustable device for reproducing the existing arc on the part which is to fit thereto.

Objects of the present invention are:

To provide a simple, inexpensive, and efficient means to transfer an arcuation from one element to another.

To provide such a device with adjusting means so that the same can be used for different arcuations.

To provide such a device with locking means so that the same can be retained in adjusted condition.

The present invention is attained by such mechanisms as are illustratively shown in the accompanying drawing as one of such structures, itself subject to changes and modifications within the scope of the appended claims, and being understood that the device so shown and specifically described in this specification is not the only use to which the present device, or modification or equivalents thereof can be put.

In the accompanying drawing:

Fig. 1 is a plan view of an arc transferring device, embodying the present invention and shows a device adapted to be set to the arc of the braking surface of a brake drum to be transferred to a device which trues up a brake shoe to fit to that drum.

Fig. 2 is a more or less diagrammatical view showing the pertinent parts thereof illustratively and as being set to the setting of Fig. 1.

Fig. 3 is an end view of Fig. 1.

Fig. 4 is a longitudinal section taken on line 4—4 of Fig. 1.

Fig. 5 is a fragmental sectional view taken on line 5—5 of Fig. 1 showing the joint structure.

Similar reference characters refer to similar parts throughout the views.

The bar A, of commercial flat stock, serving as a handle for the device, has one end thereof close fittingly embedded in the head B, is definitely located thereon and held in that definite location by the dowel pin 10, and is held onto the head by the screws 11 tapped into the head.

The head B has the flange 12 on the upper end thereof and the below described plate 13 on the bottom thereof and held thereon by the screws 14 and kept or retained in a definite location thereon or relative thereto by the dowel pins 15.

The contacting members or stools 16 and 17 are driven into the upwardly extending parts 18 of the head B to definitely locate the same relative to the head. The lateral spacing of these stools 16 and 17 is shown as being equal distance from each side of the bar A. This spacing is preferred but is not absolutely necessary. The main feature is that the stools be permanently and immovably fixed relative to the head. Each of these stools has the diametrically larger contact head 19 so that he same can more accurately contact a surface to be gaged. The neck part 20, in this instance, is provided to provide plenty of clearance for the head 19.

The links 21 and 22 are shown as being of equal length and preferably are so in practice. The link 21 has one end thereof extending between one of the upstanding parts 18 and the part 23 of the head B and is mounted therein by means of the pivot pin 24. The set screw 25 is tapped into the part 23 to prevent rotation of the pin 24. The link 21 can swivel on the pin 24 for purposes appearing herein presently.

The link 22 is constructed and mounted in exact duplicate of the link 21 and the same reference characters, as used for the link 21, are used for the link 22.

The link 26 has the end 27 thereof hinged onto the end 28 of the link 21 by means of the pivot pin 29 further described herein below and also has the slot 30 through the other end portion thereof.

The link 31 is a duplicate of the link 26 and is mounted in the same manner and the same reference characters are used thereon as are used on the link 26.

The contact member or stool 32 is mounted on the top of the link 26 a little inwardly of the pivot pin 29 and has the diametrically larger head 33 for the same reason as the head 19.

The contact member or stool 34 is mounted on the bottom side of the link 26 and has the flange 35 adjacent to this bottom side to provide a means to keep the stool 34 square with the link 26. The stool 34 has the diametrically reduced end 36 over which the stool 32 is driven so that these two stools have a common axis. The stool 34 also has, on the lower end thereof, the head 37 which is of the same diameter as the head 33.

The contact member or stool 38 is mounted on the top side of the link 31 and has the flange 39 on the bottom thereof to afford or provide a better seat of the stool on the link. This flange is the counterpart of the flange 35 so that the heads of the stools are all brought into line since the top side of the link 31 contacts the bottom side of the bar A while the bottom side of the link 26 contacts the top side of the bar A.

The contact member or stool 40 is a duplicate of the stool 34 except as to the flange 35 which, in this case, is provided on the stool 38. The reduced end of the stool 40 and the stool 38 driven thereon is duplicate structure and mounting of the stool 34. The head 41 on the stool 40 is of the same diameter as the head 42 on the stool 38.

The joint adjusting means between the links at the contacting ends thereof comprises, for each joint, the flat part 43 having the round part 44 extending therefrom and extending through the links and the flanges on the stools. The flat plate or washer 45 contacts the bottom side of the link 31 and has an opening through the same for the screw 46 which is threaded into the round part 44.

The flat plate or washer 47 contacts the bottom side of the flange 35 and has an opening therethrough for the screw 46 which is threaded into the round part 49 of the other joint.

This joint structure affords an adjusting and a locking means in that the screws 46 and 48 can be tightened so that the corresponding adjacent links can move on each other without shake or lost motion between them to keep the parts of the device in correct working order. The screws, in the manner used here, are self locking so that the adjustment made for the contact between the links will practically produce this locking effect by the tightening of the screws. Also, when so desired, the screws 46 and 48 can be screwed in so tightly that sufficient frictional contact is caused between the links to hold the same in an adjusted position and thereby also hold the parts of the entire device in an adjusted position independently of the locking means produced by the screw 50 to be described herein below.

The above mentioned plate 13 has the arcuate surfaces 51 and 52, the axes of which are in alignment with the axes of the pins 24 respectively.

The screw 50 passes through the bar A and through the slots of the links 26 and 31 and has the nut 53 threaded onto an end thereof. The nut 53 has the projection 54 on an end thereof fitting to and extending into the slot 30 of the link 36 to prevent rotation thereof when the screw 50 is manipulated. The screw has the flat head 55 to be taken hold of for manipulating the screw 50 to release frictional contact between the bar A and the links when the device is to be adjusted and to clamp these members tightly against each other after the device is adjusted.

The holes 56 are provided in the bar A so that the screw 50 may be shifted from one to another so that the links 26 and 31 can be brought into a structure supporting angularity substantially as shown when the device is adjusted for arcs of different radii.

In operation:

The joints between the links themselves being assumed to be free so that the links can move or pivot relatively, the screw 50 is first loosened to release the locking of the device. The device is then inserted into a brake drum or other similar annular article, the arc of which is to be transferred to another article. This insertion pertains only to the stools 16, 17, 32, and 38 since the bar A, due to its length, would make insertion of the entire device impossible.

During or by this insertion, the heads 19, 33 and 42 conform or adjust themselves to the arc or contour of the braking surface of the brake drum which surface is represented by the lighter line C. If the insertion itself does not contact all of the heads on this braking surface, the heads 33 and 42 can be pushed against it manually.

Tightening of the screw 50, after this adjustment, clamps all of the parts together firmly so that the device can be handled and moved from place to place and is now a sort of a gage to be used to check a part, such as the braking surface of a brake shoe, which is to fit the arc of the brake drum or to be used to transfer this arc to a device which trues up the brake shoe.

The stools 16 and 17 are fixed and, of themselves, can contact arcs of various radii. The stools 32 and 38 are movable and can be brought into contact with arcs of various radii so that the device or gage is adapted to be adjusted or set to arcs of various contours or to true circular arcs of various radii.

A contemplation of the use of the device shown and described is to transfer the arc of the braking surface of various brake drums to a device which is to machine or otherwise true up brake shoes so that the same fit accurately to the arc of the braking surface of various brake drums.

The left hand side of Fig. 1 shows, in dot and dash lines, the stools and links adjusted to the arc D which has a radius of less length than the radius for the arc C, to illustrate the different positions which the stools 32 and 38 and the links 26 and 31 can be moved into to attain or conform to various arcs.

Fig. 2 illustratively and diagrammatically shows salient structure of a brake shoe truing device E which can be adjusted according to the described gage device so that the shoe can be trued up by the truing device to fit the arc represented by the line C or the setting of the gage device so that the shoe will fit correctly to the brake drum without further fitting.

The guide pins 57 and 58 are fixed in the device E and the axes thereof correspond to the lateral spacing of the axes of the arcuate surfaces 51 and 52. The diameter of the pins is twice the radius of the arcuate surfaces 51 and 52 so that these arcuate surfaces fit to the pins when the transferring device is brought into contact therewith.

The links or arms 59 and 60 have one end thereof pivoted onto the corresponding pin 57 or 58 and the other end of each arm carries the guide pins 61 and 62, respectively. The distance from the axis of the pin 57 to the axis of the pin 61 is the same as the distance from the axis of the pin 24 to the axis of the end 27. The same spacing is also observed or carried out in regards to the arm 60 and pin 62 on the other side of the axis of the device E. Suitable means are provided on the device E to clamp the movable arms thereon in adjusted position.

When the gage or transfer device is inserted into the device E, the arcuate surfaces 51 and 52 contact the fixed guide pins 57 and 58 respectively and thereby effectively locate the gage device relative to the device E. The arms 59 and 60 are then pivoted so that the guide pins 61 and 62 contact the respective heads of the stools 34 and 40. The arms are then clamped against pivoting.

The machining or brake shoe fitting means is represented by the grinding wheel 63 mounted in the device E in such a relation that the outer circumferential surface thereof is tangent to the arc C as the wheel rotates. Adjustment may be provided for this wheel mounting so that differently sized wheels can be used or to adjust the wheel to meet this arc when the same wears down diametrically.

After the adjustment of the guide pins, the brake shoe is placed into the device E so that the braking surface thereof contacts the now adjusted guide pins. Manually then rocking the brake shoe relative to and in contact with the guide pins, while the wheel is rotating, causes the wheel to remove the high spots of the braking surface as the shoe is rocked back and forth and eventually machine the braking surface to the exact arc or contour of the braking surface of the brake drum and a correct fit between the brake shoe and the brake drum is attained.

Since the present invention is applicable for devices other than the brake members shown and described herein and since changes and modifications may be made in the structure and arrangements of the parts herein shown and described, we do not limit the present invention to the application thereof nor to the structure and arrangements of parts as shown and described.

We claim:

1. An arc transferring device having a bar, interconnected links adjustably supported on said bar, stools fixed to said links, and heads of the same diameter on the outer end of each of said stools.

2. An arc transferring device having a bar serving as a handle for the device, interconnected links supported on said bar and each being adjustable relative to said bar and relative to others of said links, stools fixed to said links and extending to each side of said bar, and heads of the same diameter on the outer ends of each of said stools.

3. An arc transferring device having a bar, links adjustably connected with said bar, arc contact members on said links and movable therewith relative to said bar and each having a head thereon adapted to be brought into contact on either a convex or a concave surface of an element for transferring an arc from a surface of the element to a surface of another element.

4. An arc transferring device having a bar, links adjustably connected with said bar, arc contact members on said links and movable therewith relative to said bar and each having a head thereon adapted to be brought into contact on either a convex or a concave surface of an element, and said heads being of the same diameter for transferring either an arc of an exterior surface of the element to an arc of an interior surface of another element or an arc of an interior surface of the element to an arc of exterior surface of another element.

5. An arc transferring device having a bar, two arc contact members fixed relative to said bar, two arc contact members movable relative to said bar to be set to the contour of either convex or concave surfaces, links connecting said movable contact members with said bar, and means for retaining said links in adjusted relation on said bar for transferring the arc to which the device was set.

6. An arc transferring device having a bar, links adjustably connected with said bar, arc contact members on said links and adjustable therewith relative to said bar for setting thereof for contact on either the contour of convex or of concave surfaces, heads on the ends of each of said contact members, the heads of each contact member being of the same diameter to transfer either an arc of an exterior surface to an interior surface or an arc of an interior surface to an exterior surface.

JOHN Y. BLAZEK.
RUSSELL G. ANDERSON.